United States Patent
Oka

[11] Patent Number: 5,757,774
[45] Date of Patent: May 26, 1998

[54] NETWORK TRAFFIC PROTECTION SYSTEM

[75] Inventor: Akihiko Oka, Kawasaki, Japan

[73] Assignee: Fujitsu Limited, Kanagawa, Japan

[21] Appl. No.: 323,758

[22] Filed: Oct. 17, 1994

[30] Foreign Application Priority Data

Mar. 18, 1994 [JP] Japan ................. 6-049608

[51] Int. Cl.[6] ................. H04L 1/22; H04J 3/14
[52] U.S. Cl. ................. 370/242; 370/249; 370/224
[58] Field of Search ................. 370/13, 15, 16,
370/16.1, 110.1, 110.4, 85.12, 85.14, 85.15,
79, 112, 102, 221–223, 241, 242, 248,
249, 401–403, 522, 524, 535, 224; 371/11.2,
20.5, 20.6, 8.2; 340/825.01, 825.05, 827

[56] References Cited

U.S. PATENT DOCUMENTS

| | | |
|---|---|---|
| 4,506,357 | 3/1985 | Nakayashiki et al. ........... 370/16 |
| 4,648,088 | 3/1987 | Cagle et al. ........... 370/16 |
| 4,835,763 | 5/1989 | Lau ........... 370/16 |
| 4,967,405 | 10/1990 | Upp et al. ........... 370/112 |
| 5,003,531 | 3/1991 | Farinholt et al. ........... 370/13 |
| 5,146,452 | 9/1992 | Pekarske ........... 370/13 |
| 5,150,356 | 9/1992 | Tsutsui ........... 370/16.1 |
| 5,159,595 | 10/1992 | Flanagan et al. ........... 370/16 |
| 5,233,600 | 8/1993 | Pekarske ........... 370/14 |
| 5,241,534 | 8/1993 | Omuro et al. ........... 370/16 |
| 5,265,096 | 11/1993 | Parruck ........... 370/110.1 |
| 5,278,824 | 1/1994 | Kremer ........... 370/16.1 |
| 5,282,200 | 1/1994 | Dempsey et al. ........... 370/85.12 |
| 5,307,353 | 4/1994 | Yamashita et al. ........... 371/11.2 |
| 5,327,427 | 7/1994 | Sandesara ........... 370/16.1 |
| 5,329,520 | 7/1994 | Richardson ........... 370/16 |
| 5,394,389 | 2/1995 | Kremer ........... 370/16.1 |

FOREIGN PATENT DOCUMENTS

| | | |
|---|---|---|
| 0573217 | 12/1993 | European Pat. Off. . |
| 9204788 | 3/1992 | WIPO . |

OTHER PUBLICATIONS

Bellcore Technical Reference, "Sonet Add–Drop Multiplex Equipment (Sonet ADM) Generic Criteria: A Undirectional, Dual-Fed, Path Protection, Switched, Self-Healing Ring Implementation", Issue 2, Sep. 1989, Supplement 1, Sep. 1991.

*Primary Examiner*—Chau Nguyen
*Attorney, Agent, or Firm*—Helfgott & Karas, P C.

[57] ABSTRACT

A failure detector, connected to receive a signal from an interface at a lower level than the SONET level, detects a failure in that interface, such as a fiber cut or the loss of signals. An AIS generator is responsive to the detection of a failure by the failure detector to generate an AIS at the SONET level (STS and VT levels). A signal processing circuit converts a low-level signal from the interface to an SONET-level signal. When receiving the SONET-level AIS from the AIS generator, the signal processing circuit inserts it onto the SONET-level signal for application to SONET ADMs.

28 Claims, 8 Drawing Sheets

NETWORK TRAFFIC PROTECTION SYSTEM

BACKGROUND OF THE INVENTION

1. Field of the Invention

The present invention relates to a network in which path protection switching rings (hereinafter referred to as PPS rings) in a synchronous optical network (SONET) are interconnected with interfaces at a lower level than the SONET level. More specifically, the present invention relates to a method and device which provide survivability of traffic or signals by triggering path switching in the event of a failure in such a network.

2. Description of the Related Art

When SONET PPS rings, for instance, access PPS rings, are connected together to set up a network, they may be linked by means of signals at lower levels than the SONET level, e.g., DSn (DS: Digital Signal, n=1, 2, 3).

Figure 1:
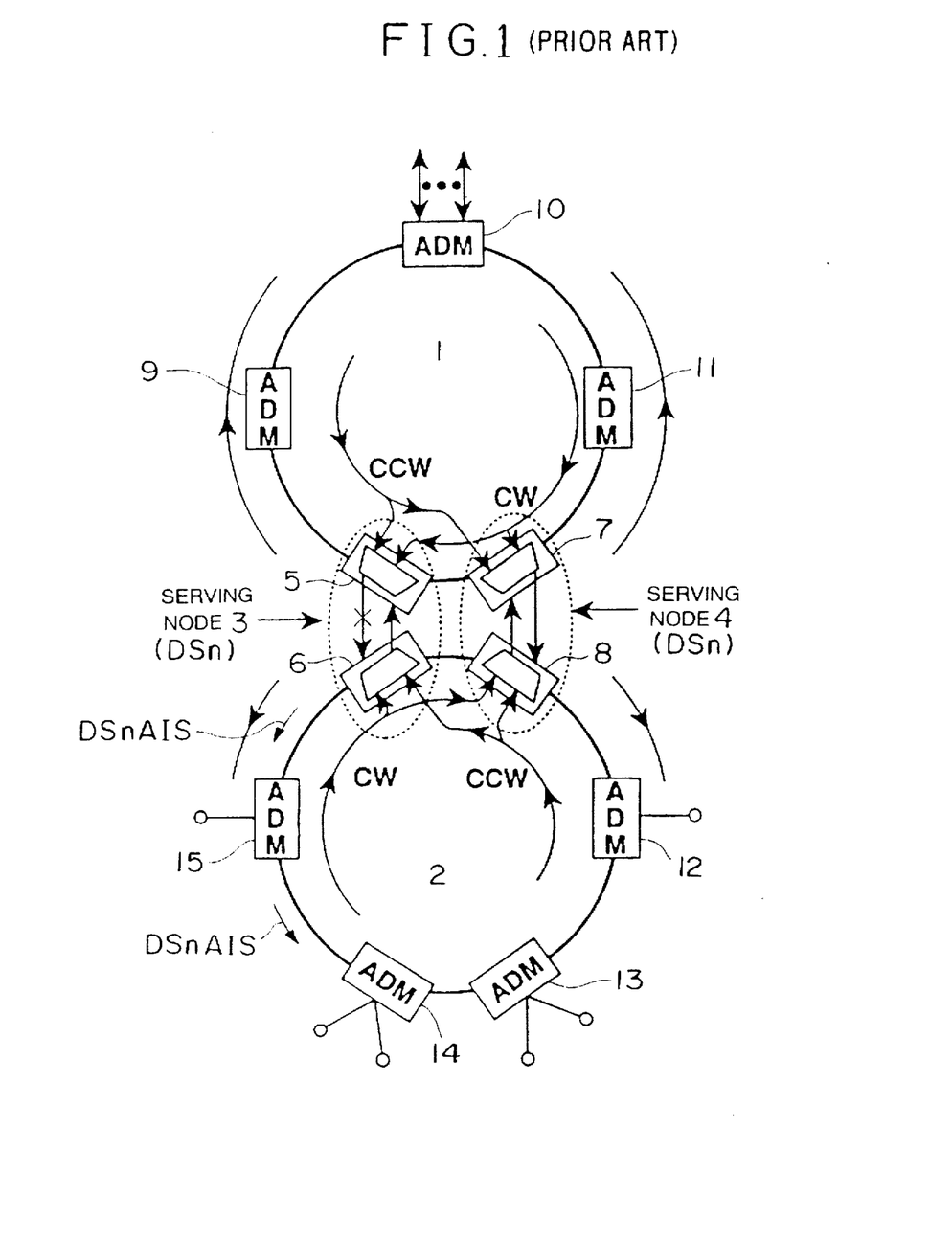
FIG. 1 shows an example of a general multiple PPS ring configuration.

FIG. 1 shows a general structure of multiple PPS rings that are connected together. As shown in FIG. 1, first and second PPS rings 1 and 2 are connected together by two physically different serving nodes, i.e., a first serving node 3 and a second serving node 4. Each of the first and second serving nodes 3 and 4 provides signal paths between the rings. It is assumed that, in a given hierarchical network, the first PPS ring 1 operates at a higher speed than the second PPS ring 2. This configuration is intended to provide survivability of traffic (e.g., DS1/DS3 services) passing between the rings 1 and 2 against a serving node failure. Any signal passing between the rings 1 and 2 is protected fully and automatically against the loss of a serving node. For survivability of services, protection against a failure in a serving node is essential in addition to protection against a break in the ring.

FIG. 1 shows how two PPS rings are interconnected to provide protection against serving node failures. At the top of the PPS ring 1, channels (e.g., DS1 services) are transmitted to the designated serving nodes 3 and 4 via the ring 1. The serving nodes 3 and 4 distribute channels to various customers on the ring 2. DS1s are mapped into 28×N floating VTs (virtual tributaries) on the ring 1. Channel assignments onto the ring 2 are made at the serving nodes 3 and 4. ADMs (Add-Drop Multiplexers) 5 through 8 in the serving nodes are connected with an electrical STS (Synchronous Transport Signal) connection or optical OC-M connection (OC: Optical Carrier) to preserve alarms and maintenance signals carried in path overhead. In the case of channelized (i.e., VT organized) STS-1, the STS-1 is carried on the ring 1 to the designated serving nodes and terminated at the serving nodes. The STS-1 is then demultiplexed to VT signals for channel assignment onto the ring 2. Further, higher-speed channels (e.g., D3 rate services) are also delivered directly from the ring 1 to a customer termination on the ring 2.

The PPS ring 1 comprises ADMs 5, 7, 9, 10, and 11, while the PPS ring 2 comprises ADMs 6, 8, 12, 13, 14, and 15. The serving node 3 comprises the ADM 5 on the PPS ring 1 and the ADM 6 on the PPS ring 2, which are connected together. The serving node 4 comprises the ADM 7 on the PPS ring 1 and the ADM 8 on the PPS ring 2, which are connected together.

The SONET ADM 10 located at the top of the ring 1 transmits its VTs in both the clockwise (CW) and counterclockwise (CCW) directions. The VT traffic is routed to both the serving nodes 3 and 4 via a drop and continue feature. The drop and continue feature permits the same traffic to be routed to the serving nodes 3 and 4 from the same direction. For instance, CCW traffic is dropped off at the SONET ADM 5 and passed to the SONET ADM 7. CW traffic is dropped off at the SONET ADM 7 and passed to the SONET ADM 5. Thus, with the drop and continue feature, the continued signal is forwarded like a pass-through signal. In this way, at either serving node, two signals (one from each direction) are available for signal selection. The ADM drop and continue feature is expected to be provisionable at the path level.

During normal operating conditions (i.e., no ring failures), 2:1 selectors in the serving nodes can be set up such that the preferred (or default) signals for traffic selection are opposite each other, ensuring that a failure in the ring 1 will not cause channel selection in both serving nodes. It is assumed that the PPS rings are revertive. At the serving node 3, therefore, the 2:1 selector of the SONET ADM 5 selects either the CW or CCW channel received from the ring 1 as the dropped signal. This signal is routed as an input to the SONET ADM 6. The SONET ADM 6 sends this signal only in the CCW direction on the ring 2. This implies that a 2:1 selector is needed only for each channel received from the ring 1. The same procedure is performed at the second serving node 4, except that the SONET ADM 8 transmits the pre-selected signal from the SONET ADM 7 only in the CW direction on the ring 2. Traffic entering the ring is then routed to only one fiber. Thus, this procedure satisfies the PPS ring requirement of having duplicate signals in the CW and CCW directions.

In the same manner, VT traffic from customers on the ring 2 (heading back to the ring 1) is routed to both the serving nodes via the drop and continue feature. Channel assignments onto the ring 1 are made at the serving nodes. The serving nodes transmit their traffic in only one direction on the ring 1, opposite of each other (ADM 5 transmits CW and ADM 7 transmits CCW), thus satisfying the PPS ring requirement of having duplicate signals in the CW and CCW directions.

It is important to emphasize that the operation of the serving nodes is symmetrical. The serving node 3 pair, ADM 5 and ADM 6, serves one of the unidirectional fibers in each PPS ring. Similarly, the serving node 4 pair, ADM 7 and ADM 8, serves the other unidirectional fiber. With this arrangement, (1) service will continue between the rings during loss of the serving node 3 or 4, including interconnecting links within each serving node; and (2) there is always a path between the rings with the loss of either node. Restoration is automatic in the event of a node failure; no rerouting of traffic between nodes is necessary. Also, both the rings 1 and 2 are treated as autonomous, independent rings, which creates a robust network. This means the ring 1 can operate at the STS-1 level, and the ring 2 can operate at the VT level. More notably, this configuration can survive a simultaneous fiber break in both the ring networks without loss of communication between the rings.

If, as described above, the SONET PPS rings are connected together by signals at lower levels (e.g., DSn: n=1, 2, 3) than the SONET level, the SONET access PPS ring may not be connected properly, providing inadequate protection against a failure, i.e., inadequate survivability of signals in the event of a failure.

That is, in the event that, when the rings are connected by DSn, a break occurs in the ring connection location, a VT Path AIS (Alarm Indication Signal) or STS (Synchronous Transport Signal) Path AIS, which is at the SONET level, cannot be sent out. If, when DSn is used in the ring connection, a break occurs in the connection. DSnAIS will be sent out. In the SONET PPS rings, the VT Path AIS or STS Path AIS triggers path switching for survivability of traffic. If the rings are connected by DSn, therefore, the SONET-level PPS ring cannot protect traffic because path switching cannot be performed.

Figure 2:
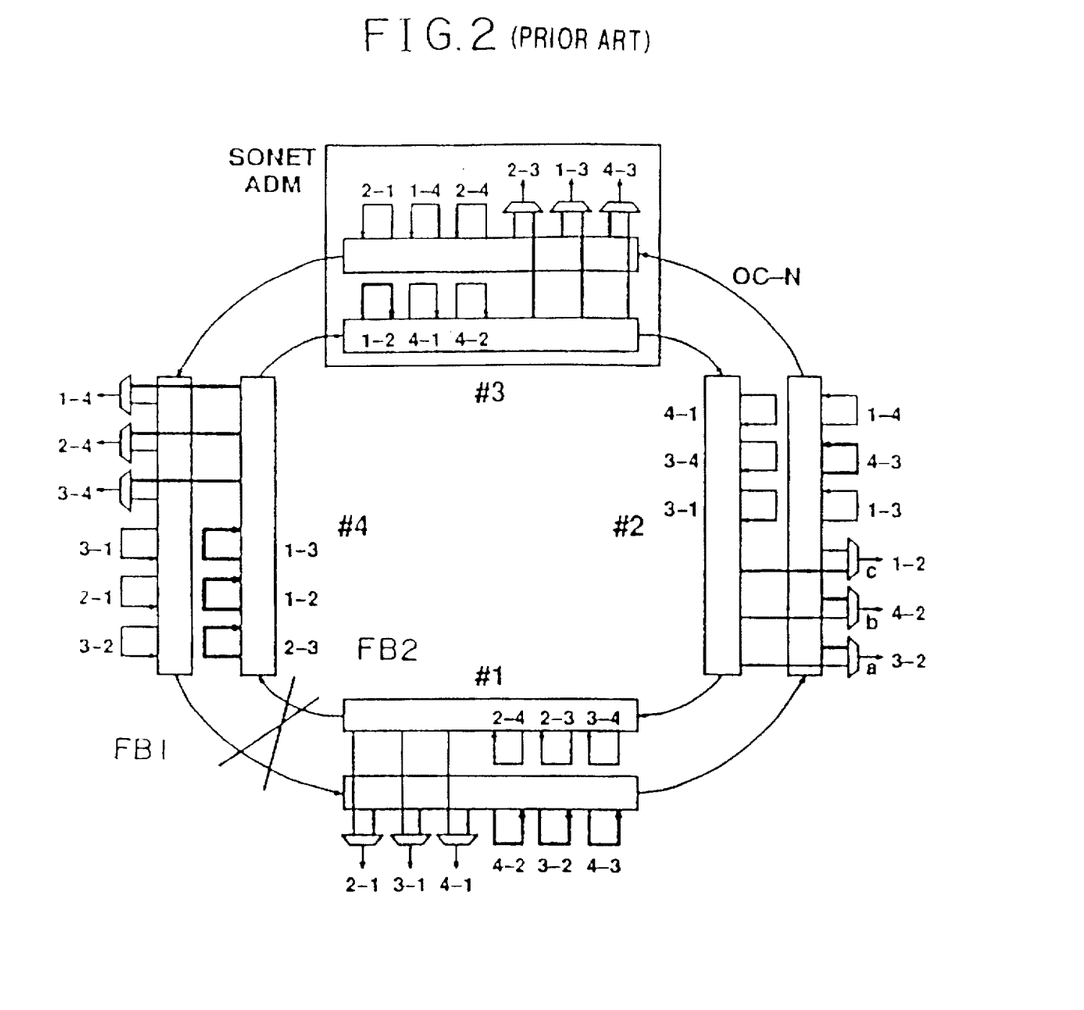
FIG. 2 is a diagram for use in explanation of signal protection by path switching in a general PPS ring.

Reference will be made to FIG. 2 to describe the survivability of traffic by performing path switching in the PPS ring at the SONET STS level.

Here, an example is taken in which the SONET PPS ring provides protection against a fiber (cable) cut. FIG. 2 shows an example of a PPS ring configuration which uses SONET ADMs that add/drop STS-1. For simplicity, only the drop side is shown. On the ring there are provided four SONET STS-1 level ADMs to form nodes #1, #2, #3, and #4. Each of these ADMs adds/drops three STS-1 signals. That is, a single SONET ADM is placed in each of the nodes #1 to #4. Furthermore, it is assumed that a single STS-1 path exists between SONET ADMs.

During normal operation STS-1 signals are inserted onto first and second fiber rings FB1 and FB2. The first fiber ring FB1 is assumed to be a working ring. When a failure occurs in the fiber pair between the nodes #1 and #4 as shown, the receiver at node #1 detects the failure, enters a failure state, and indicates the alarm condition. A partial, per-line type of failure in the PPS ADM is equivalent to the cutting of one fiber, which does not disrupt the entire ring. The control operation applies to the first and second fiber rings FB1 and FB2. The following description of the first fiber ring FB1 is applicable to the second ring FB2.

After the SONET ADM node #1 detects the loss of an incoming signal or line AIS, it inserts STS path AIS into all valid path signals. At the drop side of node #1 in the dropped direction, the path signal is continuously monitored for path AIS. The detection of Path AIS in the working path signal at the drop side triggers path switching, which causes the 2:1 selector to select a valid path from the second fiber FB2. Since the node #1 is close to the fiber cut location, all its 2:1 selectors perform path switching. The output of the node #1 on the first fiber ring FB1 has Path AIS on all its path signals, except those added at node #1. At node #2, the high-speed interface will not detect any signal failure because framing is not interrupted. The framing pattern at the output of node #1 is required to be valid at all times, which is a basic requirement for SONET ADMs. After extracting the dropped signals, the 2:1 selectors a and b of node #2 detect Path AIS and perform path switching. The 2:1 selector c of node #2 is an interface corresponding to paths between nodes #1 and #2. The signal in the first fiber ring FB1 is not affected by the cut; thus, no path switching is required. For those paths that propagate through node #2, only the 4-3 path (i.e., the path from node #4 to node #3) carries Path AIS. Both the 1-3 and 1-4 paths that originate from node #1 carry valid data.

In the PPS ring, the same algorithm is applied to node #3. In node #3, only the 4-3 path is required to perform path switching. Moreover, the three through paths at node #3 are carrying valid data that has been inserted onto the ring downstream from the failure location. Thus, none of the 2:1 selectors in node #4 is required to perform path switching.

In the ring configuration of FIG. 2, each SONET ADM adds and drops STS-NC level signals (e.g., STS-3C). The operation of a ring that adds/drops at the STS-NC level is identical to that of the PPS ring at the STS 1 level, except the control operation for failure recovery is based on the detection of STS-NC Path AIS on the STS-NC paths.

An example of a VT PPS ring consists of SONET ADMs that add/drop DS1 signals from an OC-N level optical signal. The configuration of a VT PPS ring is identical to that of an STS-1 PPS ring. Thus, the description of the function of the STS-1 PPS ring is applicable to the VT PPS ring. The differences are that path switching is performed in the VT PPS ring not at the STS-1 level but at the VT level and is triggered on a different basis. However, VT-level protection can be accomplished alternatively by protecting at the higher STS-1 path level, similar to line protection switching for all lower layers (STS/VT). This only applies when no VTs are added/dropped to the STS-1 at an intermediate node. A VT-level PPS ring is not applicable with the locked VT mode of operation. For the locked mode of operation, VT-level protection would be provided by protection at the STS-1 level.

In this way, path switching is performed at the STS/VT level in SONET PPS rings.

However, if, when DSn, such as DS1, DS3 or the like, is used in the ring connection, a cut occurs in the ring connection, then DSn AISs will be sent out in place of VT Path AISs or STS Path AISs that are SONET level AISs. In this case, in the SONET level PPS ring, such signal protection path switching as described above cannot be performed.

SUMMARY OF THE INVENTION

It is an object of the present invention to enable a network, which comprises multiple SONET PPS rings that are connected together with interfaces at a level lower than the SONET level, to trigger path switching effectively even in the event of failures in the interfaces to thereby provide survivability of signals.

In the event that a failure occurs in a network in which SONET PPS rings are interconnected with interfaces at a lower level than the SONET level, a signal protection system according to the present invention detects an AIS (Alarm Indication Signal), LOS (Loss of Signal) or LOF (Loss of Frame) in a low-level interface at an input section for low-level signals for the SONET ring, converts it to a SONET-level AIS, and triggers path switching, thereby protecting traffic or signals in the network.

A signal protection arrangement of the present invention is placed in an ADM constructing a serving node for interconnecting the PPS rings and comprises a failure detector, an AIS generator, and a signal processing unit.

The failure detector, connected to receive a signal from an interface at a lower level than the SONET level such as a DSn interface, detects a failure in the interface, such as a cable cut or the loss of signals (e.g., at least one of AIS, LOS and LOF), and issues a failure detect signal to the AIS generator.

The AIS generator is responsive to the failure detect signal from the failure detector to generate a SONET level (STS or VT level) AIS to the signal processing circuit.

The signal processing unit converts a low-level signal from the interface to a SONET level signal for transmit data. Upon receipt of a SONET AIS from the AIS generator, the signal processing unit inserts it onto the SONET level signal for application to ADMs on the SONET PPS rings.

Such a signal protection arrangement is installed in a section which feeds signals from the low-level interface to an ADM serving as one of serving nodes for interconnecting the PPS rings with low-level interfaces. Upon receipt of a failure detect signal from the low-level interface, the ADM performs path switching, thereby protecting paths and transmit signals.

Such a signal protection arrangement is provided for each of low-level-interface-connected ADMs serving as the serving nodes. The serving nodes typically form in pairs a PPS ring connection.

When the low-level interface is an interface for DS1 signals, a VT path AIS is generated based on a failure in a DS1 signal (AIS, LOS or LOF). When the low-level interface is an interface for DS2 signals, a VT path AIS is generated based on a failure in a DS2 signal. When the interface is an interface for DS3 signals, an STS path AIS is generated based on a failure in a DS3 signal.

By generating and adding a SONET level AIS, i.e., a VT path AIS (in the case of DS1 or DS2 signals) or an STS path AIS (in the case of DS3 signals), when an input interruption or other failures are detected at a low-level interface signal input section, the network signal protection system of the present invention provides survivability of signals against any node failure or other failures in the PPS rings.

BRIEF DESCRIPTION OF THE DRAWINGS

Other objects and advantages of the invention will become apparent during the following discussion in conjunction with the accompanying drawings, in which:

FIG. 4 shows a network system which has a signal protection arrangement according to a second embodiment of the present invention built in;

DETAILED DESCRIPTION OF THE PREFERRED EMBODIMENTS

<First Embodiment>

Figure 3:
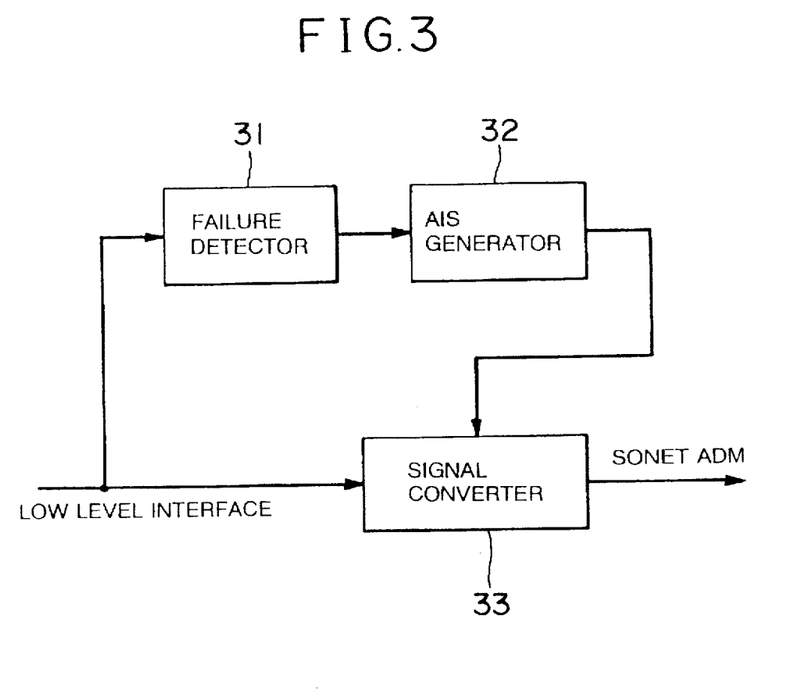
FIG. 3 is a block diagram of a signal protection arrangement according to a first embodiment of the present invention.

In FIG. 3 there is shown a signal protection arrangement according to a first embodiment of the present invention. The signal protection arrangement according to the present invention is arranged to detect, in the event that a failure occurs in a network in which SONET PPS rings are interconnected with interfaces at a lower level than the SONET level, an AIS (Alarm Indication Signal), LOS (Loss of Signal) or LOF (Loss of Frame) of a low-level interface at an input section for low-level interface signals to the SONET ring, convert it to a SONET level AIS, and triggers PPS ring path switching, thereby protecting signals against the network failure.

The signal protection arrangement of FIG. 3, which is positioned at each of ADMs (ADD-Drop Multiplexers) forming serving nodes for connecting the PPS rings together, comprises a failure detector 31, an AIS generator 32, and a signal converter 33.

The failure detector 31 is connected to receive signals from an interface at a lower level than the SONET level, e.g., DSn interface, and detects a failure in that interface, such as a line cut or loss of signals (e.g., AIS, LOS, or LOF). Upon detecting such a failure, the detector sends a failure detect signal to the AIS generator 32.

Upon receipt of the detect signal, the AIS generator 32 generates a SONET-level (e.g., STS level or VT level) AIS and applies it to the signal converter 33.

The signal converter 33 converts a low-level signal from the low-level interface to a SONET-level signal. When receiving a SONET-level AIS from the AIS generator 32, the signal converter inserts it onto the converted signal for application to the SONET PPS ring ADMs.

Figure 8:
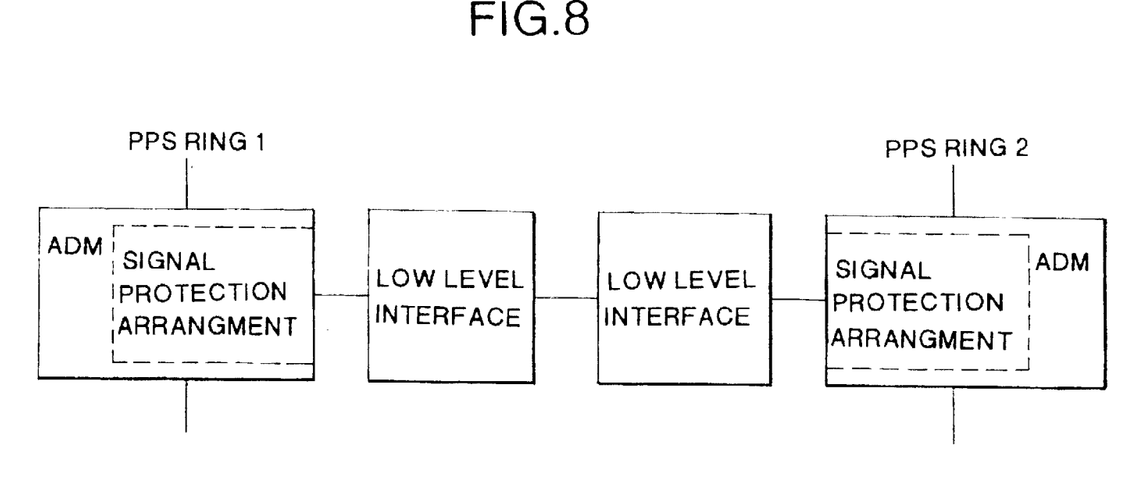
FIG. 8 is a block diagram of a serving node according to a first embodiment of the present invention.

This arrangement is positioned in that portion of each of the ADMs forming serving nodes which connect the PPS rings with low-level interfaces which applies signals from the corresponding low-level interface to the corresponding ADM, as shown n FIG. 8. Upon receipt of such a signal, the ADM triggers path switching, thereby protecting the PPS rings and signals against a failure.

The signal protection arrangement is installed in each of the interface-connected ADMs forming the serving nodes. Typically, the serving nodes form in pairs a PPS ring connection.

More specifically, when the low-level interface is DS1, a VT Path AIS is generated based on a DS1 signal failure (AIS, LOS or LOF). When the low-level interface is DS2, a VT Path AIS is generated based on a DS2 signal failure. And, when the low-level interface is DS3, an STS Path AIS is generated based on a DS3 signal failure.

Thus, by generating and adding a SONET-level AIS, i.e., a VT Path AIS (in the case of a DS1 or DS2 signal) or an STS Path AIS (in the case of a DS3 signal), in the input section of low-level interface signals, the signal protection arrangement of FIG. 3 provides survivability of signals against a node failure or other failures.

<Second Embodiment>

Figure 4:
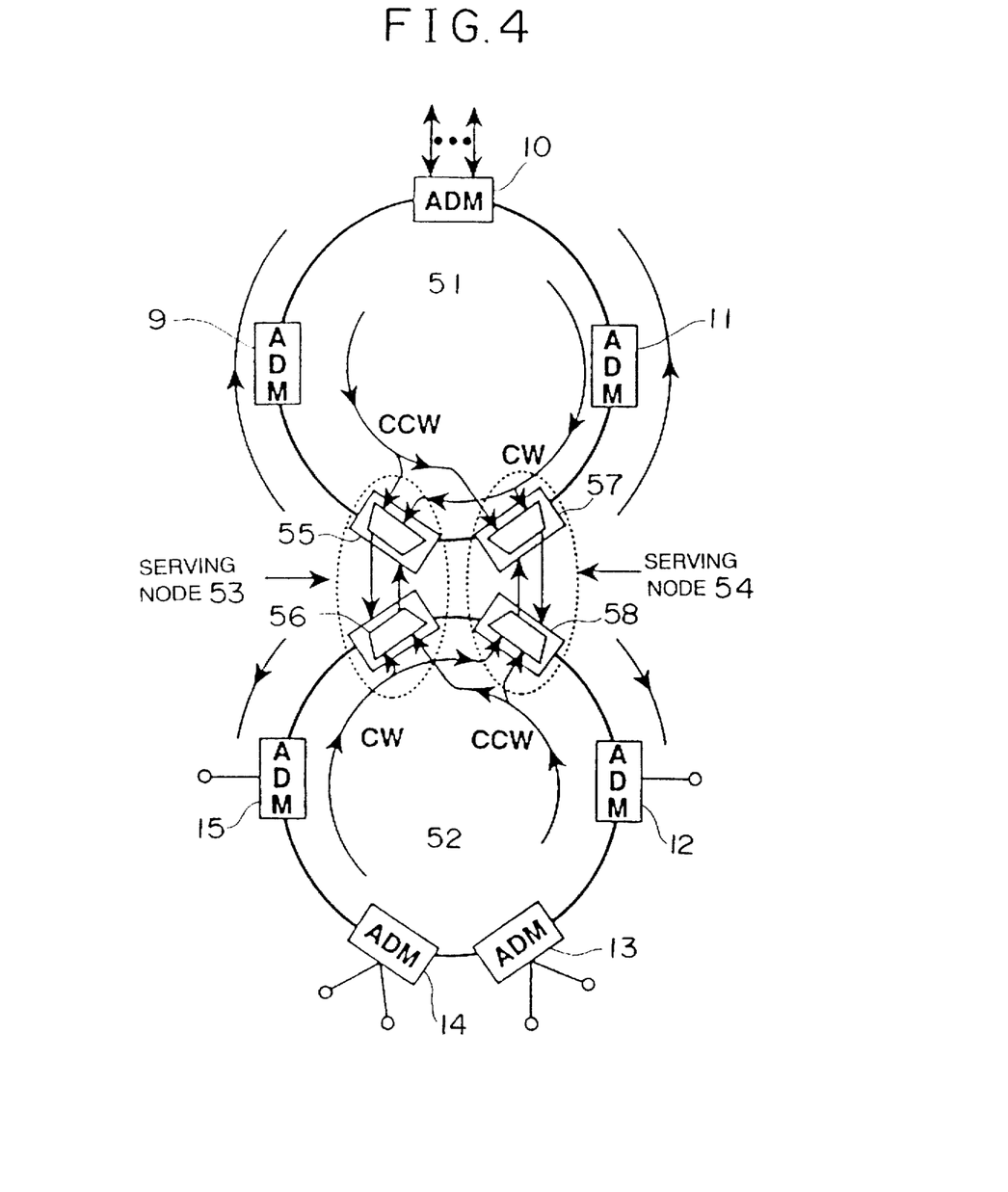

Referring now to FIG. 4, there is shown a network system which has a signal protection arrangement according to a second embodiment of the present invention built in.

This network system has first and second SONET-level PPS rings 51 and 52, which are interconnected with first and second serving nodes 53 and 54.

The PPS ring 51 has ADMs 9, 10 and 11 which are identical to those of FIG. 1 and ADMs 55 and 57 to which the signal protection arrangement of the present invention is applied. The PPS ring 52 has ADMs 12, 13, 14 and 15 which are identical to those of FIG. 1 and ADMs 56 and 58 to which the signal protection arrangement of the present invention is applied.

The serving node 53 comprises the ADMs 55 and 56, whereas the serving node 54 comprises the ADMs 57 and 58. The serving nodes 53 and 54 interconnect the SONET-level PPS rings 51 and 52 with DS1 interfaces by way of example. In the DS1 signal input section of each of the ADMs 55, 56, 57 and 58 in the serving nodes 53 and 54 there is installed a signal protection circuit which detects a DS1 signal failure to generate a SONET-level VT Path AIS, and inserts it onto signals.

Figure 5:
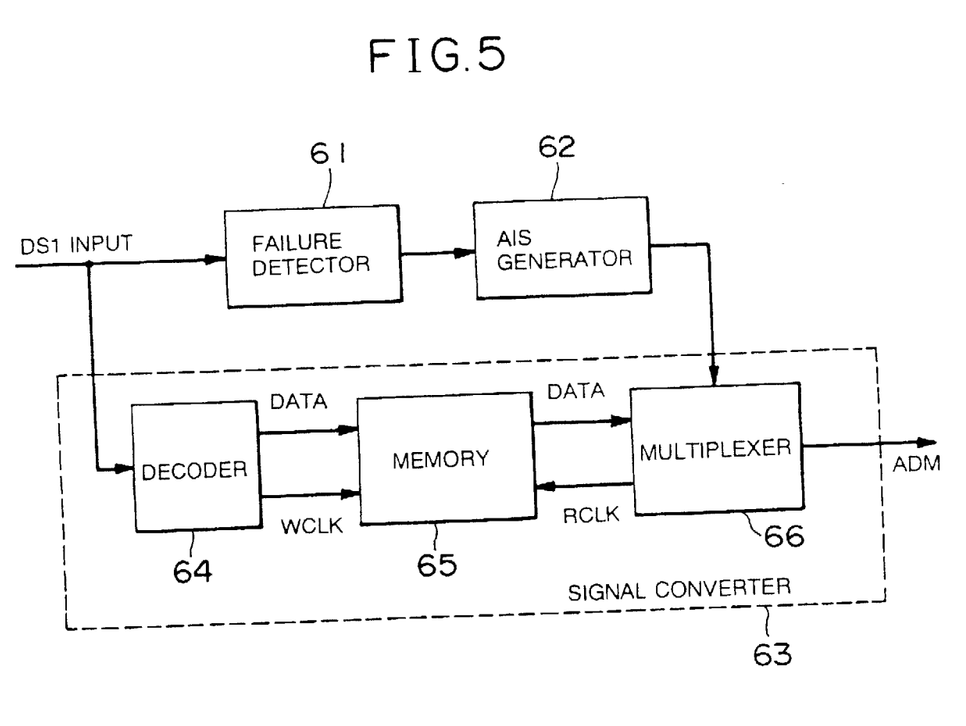
FIG. 5 is a block diagram of the signal protection arrangement of FIG. 4.

The signal protection arrangement used in the network system of FIG. 4 is constructed as shown in FIG. 5, which is a more specific arrangement of the signal protection arrangement shown in FIG. 3.

The signal protection arrangement of FIG. 5 comprises a failure detector 61, an AIS generator 62, and a signal converter 63. The signal converter 63 comprises a decoder 64, a memory 65, and a multiplexer 66.

The failure detector 61 detects a break in a DS1 signal path or other path failures on the basis of AIS, LOS or LOF generated in the DS1 signal path. The AIS generator 62 is responsive to the detection of a DS1 failure by the failure detector 61 to generate a SONET-level VT Path AIS, for example.

The signal converter 63 converts DS1 level signals to SONET VT path levels. That is, the decoder 64 converts various DS1 codes to VT path codes. The memory 65 temporarily holds a DS1 signal output from the decoder 64, serving as a buffer for speed conversion to VT path signals. The multiplexer 66 multiplexes a VT path AIS generated by the AIS generator 62 with data read from the memory 65. The decoder 64 writes data into the memory 65 synchronously with a write clock WCLK, and the multiplexer 66 reads data from the memory 65 synchronously with a read clock RCLK.

Here, VT-mode (floating VT mode) mapping of DS1 mode information will be described mainly in connection with AIS.

Figure 6:
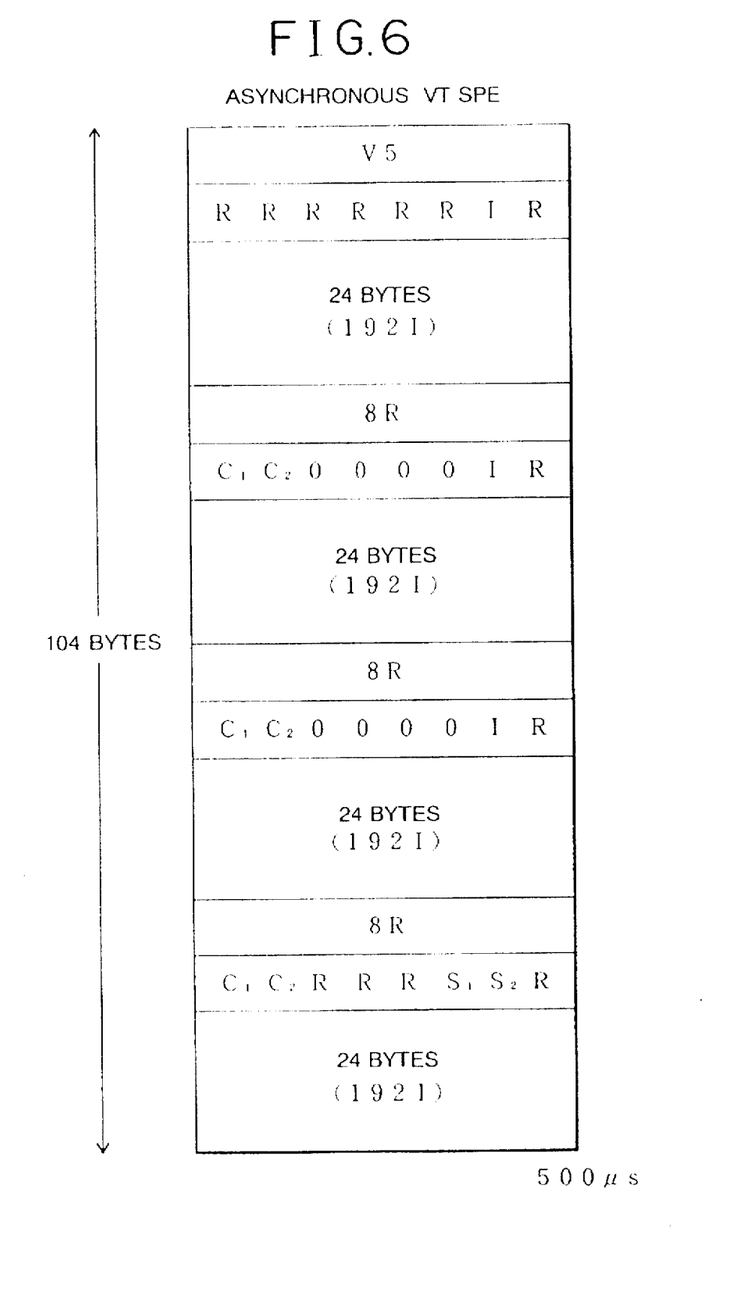
FIG. 6 is a diagram for use in explanation of mapping DS1 information of the VT format in the network system of FIG. 4.
Figure 7:
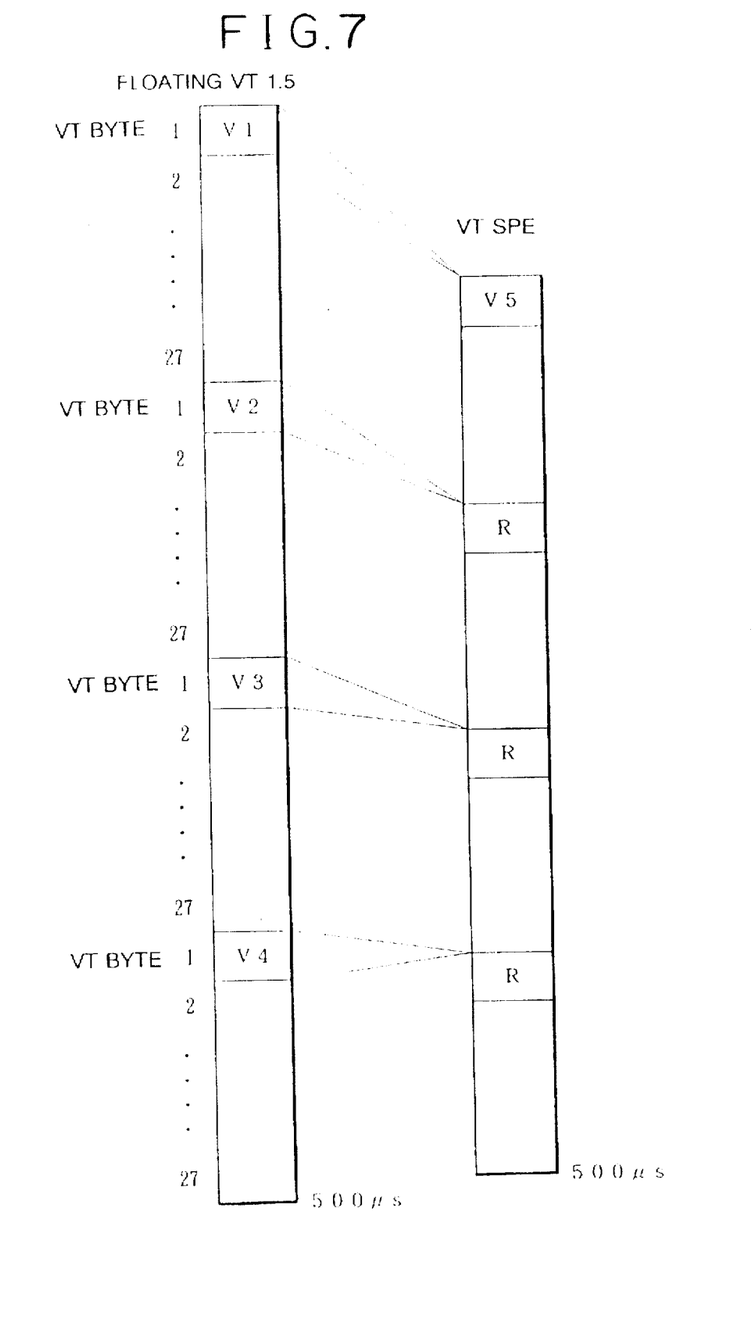
FIG. 7 is a diagram for use in explanation of the VT format in the network system of FIG. 4.

Reference is made to FIGS. 6 and 7 to describe how DS1 payload is mapped into a VT path frame.

In order to transmit a DS1 signal via a VT path, the DS1 format must be mapped on a VT path. FIG. 6 shows an example of asynchronous mapping of a DS1 signal into a VT SPE (Synchronous Payload Envelope) format.

The VT SPE format of FIG. 6 into which DS1 payload is mapped consists of 26 bytes×4=104 bytes. Of the first 26 bytes, the first byte is VT path overhead (POH) V5 and the second byte consists of 6 fixed-stuff bits R, a bit of information I, and a bit of fixed stuff R, followed by 24 bytes (192 bits) of information I. The second and third 26 bytes are identical to each other, their first byte consisting of 8 fixed-stuff bits R and their next byte consisting of 2 stuff-control bits $C_1$ and $C_2$, 4 bits of overhead O, a bit of information I, and a fixed-stuff bit R, followed by 24 bytes of information I. Of the last 26 bytes, the first byte consists of 8 fixed-stuff bits R, and the next byte consists of 2 stuff control bits $C_1$ and $C_2$, 3 fixed-stuff bits R, 2 stuff opportunity bits S1 and S2, and a fixed-stuff bit R, followed by 24 bytes of information I.

Such a VT SPE is mapped into the floating VT 1.5 format as shown in FIG. 7.

In FIG. 7, 26-byte blocks in the VT SPE shown in FIG. 6 are respectively incorporated into 26 VT bytes 2 to 27 in blocks corresponding to VT pointer 1 (V1), VT pointer 2 (V2), VT pointer 3 (V3) and VT-reserved area V4 of the floating VT 1.5 format. The VT pointer 1 (V1), VT pointer 2 (V2), VT pointer 3 (V3) and VT-reserved area V4 each require one byte, which is placed into the corresponding VT byte 1.

In this format, in the case of DS1 level AIS by way of example, all Is in FIG. 6, i.e., the seventh bit of the second byte in each of the first, second and third 26-byte blocks and the third through twenty-sixth bytes (24 bytes in total) in each of 26-byte blocks, are set to ones. In contrast, in the case of VT 1.5 AIS, VT bytes 1 through 27 in each of blocks for VT pointer 1V1, VT pointer 2V2, VT pointer 3V3 and VT-reserved area V4, i.e., 108 bytes in total, are all set to ones.

Thus, the signal converter 63 places DS1 signals into VT payload and converts them into such VT path signals as shown in FIG. 7 by the use of the decoder 64, memory 65, and multiplexer 66. In this state, however, Is of FIG. 6 are merely set to ones even if a DS1-level AIS is originated. This AIS is not recognized on the VT paths and hence no path switching is performed; thus signals cannot be protected. Thus, the failure detector 61 detects the DS1-level AIS and causes the AIS generator 62 to generate a VT path AIS, i.e., a signal which sets 108 bytes in the VT format shown in FIG. 7 to all ones. This signal is inserted into the VT format by the multiplexer 66, so that the 108 bytes are set to all ones.

In this way, the DS1-level AIS is converted to the VT-level AIS, which, in turn, is transferred to the ADMs constructing the SONET-level PPS ring.

Upon receipt of the AIS in a VT path signal, each of the ADMs performs path switching, thereby providing survivability of signals.

Thus, in the event of the loss of a DS1 signal due to a cable cut in the first serving node 53, for example, in FIG. 4, the PPS ring protection mechanism is activated properly, maintaining signal transmissions between the PPS rings.

Even when a DS1-level AIS is generated by dual failure not by cable cuts in the serving nodes 53 and 54, it can be detected by the failure detector 61, thereby permitting the same processing as above to be performed.

The above description was made taking the use of DS1 as a signal at a lower level than the SONET level by way of example. For DS2, the same signal protection arrangement as above can be used for survivability of signals. For DS3, the AIS generator 62 is simply required to generate an STS path AIS in place of a VT-level AIS.

In summary, it is only required that, in the signal input section for the SONET level, a SONET-level AIS be generated based on the detection of the loss of lower level signals.

It is apparent that, in this invention, a wide range of different working modes can be formed based on the invention without deviating from the spirit and scope of the invention.

What is claimed is:

1. A signal protection method for protecting signals in a network in the event of a failure of the network in which SONET path protection switching rings are interconnected with interfaces, using a DS signal of a lower level than a signal used for SONET, the signal protection method comprising the steps of:

converting the DS signal to the signal used for SONET;

detecting a failure in an interface from the DS signal at an input section for low-level signals to a SONET PPS ring, said detecting step being carried out before said converting step;

generating a SONET-level alarm indication signal in response to detection of the failure in the interface;

transmitting said alarm indication signal to the SONET PPS ring; and triggering path switching by said alarm indication signal.

2. A signal protection method for protecting signals in a network in the event of a failure in the network in which SONET path protection switching (PPS) rings are interconnected with first and second serving nodes consisting of interfaces, using a DS signal of a lower level than SONET, the signal protection method comprising the steps of:

detecting a failure in an interface from the DS signal at input sections for low-level signals to the SONET PPS ring in said first and second serving nodes;

converting, after said detecting step, the DS signal to the signal used for SONET;

generating a SONET-level alarm indication signal (AIS) in response to detection of the failure in the interface;

transmitting said alarm indication signal to the SONET-level PPS ring; and triggering path switching by said alarm indication signal.

3. The method according to claim 2, wherein said failure in the interface in said first and second serving nodes is detected by a DS1 signal AIS, and said alarm indication signal is a VT path AIS.

4. The method according to claim 2, wherein said failure in the interface in said first and second serving nodes is detected by a DS1 signal LOS, and said alarm indication signal is a VT path AIS.

5. The method according to claim 2, wherein said interface failure in said first and second serving nodes is detected by a DS1 signal LOF, and said alarm indication signal is a VT path AIS.

6. The method according to claim 2, wherein said failure in the interface in said first and second serving nodes is detected by one of DS1 signal AIS, LOS and LOF, and said alarm indication signal is a VT path AIS.

7. The method according to claim 2, wherein said failure in the interface in said first and second serving nodes is detected by a DS2 signal AIS, and said alarm indication signal is a VT path AIS.

8. The method according to claim 2, wherein said failure in the interface in said first and second serving nodes is detected by a DS2 signal LOS, and said alarm indication signal is a VT path AIS.

9. The method according to claim 2, wherein said failure in the interface in said first and second serving nodes is detected by a DS2 signal LOF, and said alarm indication signal is a VT path AIS.

10. The method according to claim 2, wherein said failure in the interface in said first and second serving nodes is detected by one of DS2 signal AIS, LOS, and LOF, and said alarm indication signal is a VT path AIS.

11. The method according to claim 2, wherein said failure in the interface in said first and second serving nodes is detected by a DS3 signal AIS, and said alarm indication signal is an STS path AIS.

12. The method according to claim 2, wherein said failure in the interface in said first and second serving nodes is detected by a DS3 signal LOS, and said alarm indication signal is an STS path AIS.

13. The method according to claim 2, wherein said failure in the interface in said first and second serving nodes is detected by a DS3 signal LOF, and said alarm indication signal is an STS path AIS.

14. The method according to claim 2, wherein said failure in the interface in said first and second serving nodes is detected by one of DS3 signal AIS, LOS and LOF, and said alarm indication signal is a STS path AIS.

15. A network system comprising:

multiple SONET PPS rings;

serving node means for interconnecting said multiple SONET PPS rings with interfaces, using a DS signal of a lower level than a signal used for SONET;

signal converting means for converting the DS signal to the signal used for SONET;

failure detecting means placed at an input section for low-level signals to said multiple SONET PPS rings in said serving node means for detecting a failure in an interface from the DS signal, said detecting being carried out before converting the DS signal to the signal used for SONET; and alarm generating means, placed in said serving node means, for generating a SONET level alarm indication signal to said multiple SONET PPS rings in response to detection of the failure in the interface by said failure detecting means.

16. A network system comprising:

multiple SONET PPS rings;

first and second serving nodes for interconnecting said multiple SONET PPS rings with interfaces, using a DS signal of a lower level than a signal used for SONET;

signal converting means for converting the DS signal to the signal used for SONET;

failure detecting means placed at an input section for low-level signals to the multiple SONET PPS rings in each of said first and second serving nodes for detecting failure in an interface from the DS signal, said detecting being carried out before converting the DS signal to the signal used for SONET; and alarm generating means, placed in each of said first and second serving nodes, for generating a SONET level alarm indication signal to said multiple SONET PPS rings in response to detection of failure in the interface by said failure detecting means.

17. The network system according to claim 16, wherein said first and second serving nodes are serving nodes for interconnecting said multiple SONET PPS rings with said interfaces, said interfaces being DS1 interfaces, said failure detecting means in each of said first and second serving nodes detecting a DS1 signal AIS indicative of a failure, and said alarm generating means in each of said first and second serving nodes generating a VT path AIS as an alarm indication signal.

18. The network system according to claim 16, wherein said first and second serving nodes are serving nodes for interconnecting said multiple SONET PPS rings with said interfaces, said interfaces being DS1 interfaces, said failure detecting means in each of said first and second serving nodes detecting a DS1 signal LOS indicative of a failure, and said alarm generating means in each of said first and second serving nodes generating a VT path AIS as an alarm indication signal.

19. The network system according to claim 16, wherein said first and second serving nodes are serving nodes for interconnecting said multiple SONET PPS rings with said interfaces, said interfaces being DS1 interfaces, said failure detecting means in each of said first and second serving nodes detecting a DS1 signal LOF indicative of a failure, and said alarm generating means in each of said first and second serving nodes generating a VT path AIS as an alarm indication signal.

20. The network system according to claim 16, wherein said first and second serving nodes are serving nodes for interconnecting said multiple SONET PPS rings with said interfaces, said interfaces being DS1 interfaces, said failure detecting means in each of said first and second serving nodes detecting one of AIS, LOS and LOF of a DS1 signal indicative of a failure, and said alarm generating means in each of said first and second serving nodes generating a VT path AIS as an alarm indication signal.

21. The network system according to claim 16, wherein said first and second serving nodes are serving nodes for interconnecting said multiple SONET PPS rings with said interfaces, said interfaces being DS2 interfaces, said failure detecting means in each of said first and second serving nodes detecting AIS indicative of a failure, and said alarm generating means in each of said first and second serving nodes generating a VT path AIS as an alarm indication signal.

22. The network system according to claim 16, wherein said first and second serving nodes are serving nodes for interconnecting said multiple SONET PPS rings with said interfaces, said interfaces being DS2 interfaces, said failure detecting means in each of said first and second serving nodes detecting LOS of a DS2 signal indicative of a failure.

and said alarm generating means in each of said first and second serving nodes generating a VT path AIS as an alarm indication signal.

23. The network system according to claim 16, wherein said first and second serving nodes are serving nodes for interconnecting said multiple SONET PPS rings with said interfaces, said interfaces being DS2 interfaces, said failure detecting means in each of said first and second serving nodes detecting LOF of a DS2 signal indicative of a failure, and said alarm generating means in each of said first and second serving nodes generating a VT path AIS as an alarm indication signal.

24. The network system according to claim 16, wherein said first and second serving nodes are serving nodes for interconnecting said multiple SONET PPS rings with said interfaces, said interfaces being DS2 interfaces, said failure detecting means in each of said first and second serving nodes detecting one of AIS, LOS and LOF of a DS2 signal indicative of a failure, and said alarm generating means in each of said first and second serving nodes generating a VT path AIS as an alarm indication signal.

25. The network system according to claim 16, wherein said first and second serving nodes are serving nodes for interconnecting said multiple SONET PPS rings with said interfaces, said interfaces being DS3 interfaces, said failure detecting means in each of said first and second serving nodes detecting a DS3 signal AIS indicative of a failure, and said alarm generating means in each of said first and second serving nodes generating an STS path AIS as an alarm indication signal.

26. The network system according to claim 16, wherein said first and second serving nodes are serving nodes for interconnecting said multiple SONET PPS rings with said interfaces, said interfaces being DS3 interfaces, said failure detecting means in each of said first and second serving nodes detecting a DS3 signal LOS indicative of a failure, and said alarm generating means in each of said first and second serving nodes generating an STS path AIS as an alarm indication signal.

27. The network system according to claim 16, wherein said first and second serving nodes are serving nodes for interconnecting said multiple SONET PPS rings with said interfaces, said interfaces being DS3 interfaces, said failure detecting means in each of said first and second serving nodes detecting LOF of a DS3 signal indicative of a failure, and said alarm generating means in each of said first and second serving nodes generating an STS path AIS as an alarm indication signal.

28. The network system according to claim 16, wherein said first and second serving nodes are serving nodes for interconnecting said multiple SONET PPS rings with said interfaces, said interfaces being DS3 interfaces, said failure detecting means in each of said first and second serving nodes detecting one of AIS, LOS and LOF of a DS3 signal indicative of a failure, and said alarm generating means in each of said first and second serving nodes generating an STS path AIS as an alarm indication signal.

* * * * *